United States Patent
Portisch et al.

(10) Patent No.: US 11,106,861 B2
(45) Date of Patent: Aug. 31, 2021

(54) LOGICAL, RECURSIVE DEFINITION OF DATA TRANSFORMATIONS

(71) Applicant: SAP SE, Walldorf (DE)

(72) Inventors: Jan Portisch, Bruchsal (DE); Joachim Gross, Altrip (DE); Sandra Bracholdt, Dielheim (DE)

(73) Assignee: SAP SE, Walldorf (DE)

( * ) Notice: Subject to any disclaimer, the term of this patent is extended or adjusted under 35 U.S.C. 154(b) by 72 days.

(21) Appl. No.: 16/265,063

(22) Filed: Feb. 1, 2019

(65) Prior Publication Data

US 2020/0250260 A1   Aug. 6, 2020

(51) Int. Cl.
*G06F 40/151*   (2020.01)
*G06F 16/2458*  (2019.01)
*G06F 40/103*   (2020.01)

(52) U.S. Cl.
CPC ........ *G06F 40/151* (2020.01); *G06F 16/2458* (2019.01); *G06F 40/103* (2020.01)

(58) Field of Classification Search
None
See application file for complete search history.

(56) References Cited

U.S. PATENT DOCUMENTS

| | | | | |
|---|---|---|---|---|
| 7,934,207 B2* | 4/2011 | Gustafsson | ........... | G06F 16/258 717/143 |
| 8,370,233 B2 | 2/2013 | Kaisermayr et al. | | |
| 8,788,931 B1* | 7/2014 | Chen | ...................... | G06F 40/151 715/234 |
| 2009/0248586 A1 | 10/2009 | Kaisermayr et al. | | |
| 2010/0070500 A1* | 3/2010 | Cui | .......... | G06F 16/25 707/736 |
| 2012/0166459 A1* | 6/2012 | Ritter | .................... | G06F 16/258 707/756 |
| 2013/0111381 A1* | 5/2013 | Ritter | .................... | G06Q 10/06 715/765 |

(Continued)

OTHER PUBLICATIONS

"Scratch (programming language)," Wikipedia, visited Jan. 31, 2019, 13 pages.

(Continued)

*Primary Examiner* — Howard Cortes
(74) *Attorney, Agent, or Firm* — Klarquist Sparkman, LLP

(57) ABSTRACT

Techniques and solutions are described for defining transformation specifications in a programming-language independent language and converting such specifications to one or more executable formats. The language can provide for defining rules and actions. Rules can refer to (e.g., be based at least in part on) data targets, such as attributes of a schema, whose identifiers are to be read or updated, or to other rules. Rules can be reused, and can recursively refer to one another, such that a large number of complex schema transformations can be accomplished using a series of first order logic statements. Actions can define what, and how, values will be changed when a predicate rule is satisfied. A transformation specification in the language can be parsed and selectively complied to one or more executable formats, including in programming languages such as the structured query language. Disclosed technologies can facilitate data transformations by non-technical users.

16 Claims, 8 Drawing Sheets

(56) References Cited

U.S. PATENT DOCUMENTS

| | | | |
|---|---|---|---|
| 2013/0138597 A1* | 5/2013 | Kyle | G06F 40/14 706/48 |
| 2013/0166495 A1* | 6/2013 | Kazmaier | G06F 16/3344 707/602 |
| 2013/0179772 A1* | 7/2013 | Nakamura | G06F 40/151 715/234 |
| 2016/0321307 A1* | 11/2016 | Dingman | G06F 16/25 |
| 2016/0357787 A1 | 12/2016 | Kolata et al. | |
| 2016/0371117 A1* | 12/2016 | Mishra | G06F 9/4881 |
| 2018/0081938 A1* | 3/2018 | Khuong | G06F 16/248 |
| 2019/0034482 A1* | 1/2019 | Werner | G06F 16/2433 |
| 2019/0303207 A1* | 10/2019 | Vadapandeshwara | G06F 9/5044 |
| 2019/0384836 A1* | 12/2019 | Roth | G06F 16/211 |
| 2020/0349130 A1 | 11/2020 | Bracholdt et al. | |

OTHER PUBLICATIONS

Lecoutre, C. et al., "Improving the lower bound of simple tabular reduction," retrieved from https://link.springer.com/article/10.1007/s10601-014-9171-9 on or before Jan. 2018, 9 pp.

Lecoutre, C., "STR2: optimized simple tabular reduction for table constraints," retrieved from https://link.springer.com/article/10.1007/s10601-011-9107-6 on or before Jan. 2018, 31 pp.

Gulwani, S. et al., "Program Analysis as Constraint Solving," retrieved from https://www.microsoft.com/en-us/research/wp-content/uploads/2016/12/pldi08_cs.pdf on or before Jan. 2018, 12 pp.

Marriott, K. et al., "Negative Boolean constraints," retrieved from https://www.sciencedirect.com/science/article/pii/030439759500209X on or before Jan. 2018, 16 pp.

Li, H. et al., "Making Simple Tabular Reduction Works on Negative Table Constraints," retrieved from https://pdfs.semanticscholar.org/8057/f234d2f1b3591cffeb8d651e15e1043fd78d.pdf on or before Jan. 2018, 2 pp.

Hauptmann, "Introduction to Variant Configuration with an example model," retrieved from https://wiki.scn.sap.com/wiki/display/PLM/Introduction+to+Variant+Configuration+with+an+example+model on or before Jan. 2018, 11 pp.

Blumöhr et al., "Variant Configuration with SAP," retrieved from https://www.sap-press.com/variant-configuration-with-sap_2889/ on or before Jan. 2018, 52 pp.

Kumbum, R., "Variant Configuration," retrieved from https://www.slideshare.net/KUMBUM/sap-variant-configuration-34736665 on or before Jan. 2018, 84 pp.

Ullmann, J., "Partition search for non-binary constraint satisfaction," retrieved from http://cse.unl.edu/~choueiry/Documents/Ullmann2007-GAC.pdf on or before Jan. 2018, 40 pp.

Wallace, M., "Practical Applications of Constraint Programming," retrieved from https://link.springer.com/article/10.1007/BF00143881 on or before Jan. 2018, 30 pp.

"Probability Tree Diagrams," https://www.mathsisfun.com/data/probability-tree-diagrams.html, 5 pp.

"Binary tree," Wikipedia, available at: https://en.wikipedia.org/wiki/Binary_tree, 7 pages, page last updated Jul. 2, 2019, retrieved on Aug. 20, 2019.

* cited by examiner

RULE DEFINITION rule_3: rule_1 AND rule_2
RULE DEFINITION rule_1: OBJ_1 > 0.5
RULE DEFINITION rule_2: OBJ_2 = 'Volker'

510
⎿ RULE DEFINITION rule_3: (OBJ_1 > 0.5) AND (OBJ_2 = 'Volker')

⎾ RULE DEFINITION rule_3: IF {
520            OBJ_1 > 0.5;
               IF {
                   OBJ_2 = 'Volker';
               }
           }

730
SELECT "consequence" as "OBJ_4"
FROM
    734
    ( SELECT
        CASE
            WHEN
                "OBJ_3" = 'SWAP'
            THEN 'CAT_B'
        END as "consequence"
      FROM <hana_data_source_1>
    )
UNION
    738
    ( SELECT
        CASE
            WHEN
                "OBJ_1" = 'Value1'
                AND
                "OBJ_2" > 5.5
            THEN 'CAT_A'
        END as "consequence"
      FROM <hana_data_source_1>
    )
LIMIT 1
    742

712

710
714  DATA OBJECT DEFINITION: OBJ_1, OBJ_2, OBJ_3, OBJ_4
714  714  714
716  RULE DEFINITION rule_1: OBJ_1 = 'Value1'
716  RULE DEFINITION rule_2: OBJ_2 > 5.5
716a RULE DEFINITION rule_3: rule_1 AND rule_2
716a RULE DEFINITION rule_4: OBJ_3 = 'SWAP'
716  CONSEQUENCE DEFINITION consequence_1: rule_3 ->
     OBJ_4 = 'CAT_A'
     722a
722b CONSEQUENCE DEFINITION consequence_2: rule_4 ->
     OBJ_4 = 'CAT_B'
     MAPPING DEFINITION mapping_1: consequence_1,
     consequence_2
     726

FIG. 7

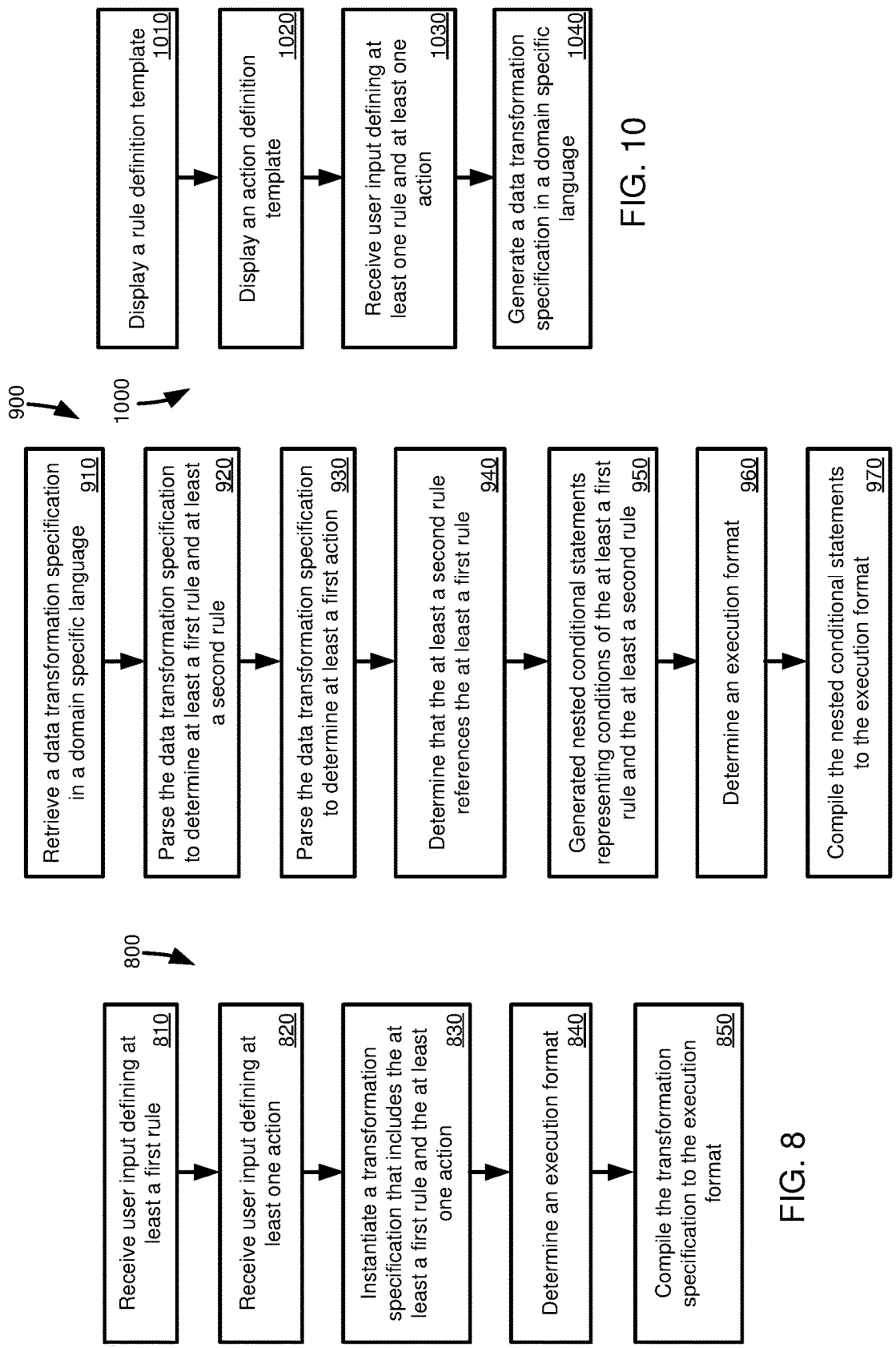

LOGICAL, RECURSIVE DEFINITION OF DATA TRANSFORMATIONS

FIELD

The present disclosure generally relates to transforming or converting data values or schemas. Particular implementations relate to defining data transformation specifications in a language that is independent of a particular programming language or execution environment, and converting such representation to an executable format that can be executed in a given programming language or execution environment.

BACKGROUND

As computers become more pervasive, integrating data from, or converting data between, different sources can become more complex. For example, it may be desired to use data from different sources in a common application, but the data may be stored in different formats, or using a different schema. Or, it may be desired to migrate data to a new format. Altering data values, or metadata associated with the data values (including a schema used to describe or process the data values) can be cumbersome, as it can require technical knowledge in understanding an initial format and schema of the data, a final, desired format and schema of the data, and how to convert the data from the initial format and schema to the final format and schema.

A user's technical knowledge may determine tools that the user prefers to express how data should be arranged or changed, such as using first order logic statements (e.g., non-technical descriptions of the desired changes), spreadsheets, or actual code (for example, SQL statements). Transforming data may also require someone with a detailed understanding of the use or purpose of the data. As an individual with a detailed understanding of technical aspects of a data set is often not the same individual having a detailed semantic understanding of the data, difficulties can arise in transforming data values or metadata. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for defining transformation specifications in a programming-language independent language and converting such specifications to one or more executable formats. The language can provide for defining rules and actions. Rules can refer to (e.g., be based at least in part on) data targets, such as attributes of a schema, whose identifiers are to be read or updated, or to other rules. Rules can be reused, and can recursively refer to one another, such that a large number of complex schema transformations can be accomplished using a series of straightforward first order logic statements. Actions can define what, and how, values will be changed when a predicate rule is satisfied. A transformation specification in the language can be parsed and selectively compiled to one or more executable formats, including in programming languages such as the structured query language. Disclosed technologies can thus facilitate data transformations by non-technical users.

In one aspect, a method is provided of compiling a transformation specification in a domain specific language to an execution format. User input is received defining at least a first rule. The at least a first rule is of a rule format. The rule format includes a first building block, and operator, and a second building block. The first and second building blocks serve as operands for the first operator, and are selected from rules having the rule format, a data target, or a literal of a data type.

User input is received defining at least one action. The at least one action is of an action format. The action format includes a rule serving as a predicate for the at least one action, a second operator to be executed if the predicate is satisfied, a data target serving as a first operand for the second operator, and a value serving as a second operand for the second operator. A transformation specification is instantiated that includes the at least a first rule and the at least one action. An execution format to which the transformation specification is to be converted is determined. The transformation specification is compiled to the execution format.

In another aspect, a method is provided that can be performed by a domain specific language compiler. A data transformation specification in a domain specific language is retrieved. The data transformation specification is parsed to determine at least a first rule and at least a second rule specified in the data transformation specification. The data transformation specification is parsed to determine at least a first action specified in the data transformation specification. It is determined that the at least a second rule references the at least a first rule. Nested conditional statements are generated, representing conditions of the at least a first rule and the at least a second rule. An execution format is determined. The nested conditional statements are compiled to the execution format.

In a further aspect, a method is provided for rendering a data transformation specification user interface useable to define a data transformation specification in a domain specific language. A rule definition template is displayed. The rule definition template includes a user interface element for a first building block, a user interface element for an operator, and a user interface element for a second building block. An action definition template is displayed. The action definition template includes a user interface element for a rule and a user interface element for a value. User input is received for the rule definition template and the action definition template, defining at least one rule and at least one action. A data transformation in a domain specific language is generated and includes the at least one rule and the at least one action.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 7 illustrates how a data transformation specification in a domain specific language can be converted to an executable specification or format, such as SQL code as shown.

FIG. 8 is a flowchart of a disclosed method of compiling a transformation specification in a domain specific language to an execution format.

FIG. 9 is a flowchart of a disclosed method that can be carried out by a domain specific language compiler.

FIG. 10 is a flowchart illustrating operations in a disclosed embodiment of rendering a data transformation specification user interface.

DETAILED DESCRIPTION

Example 1—Overview

Figure 1:
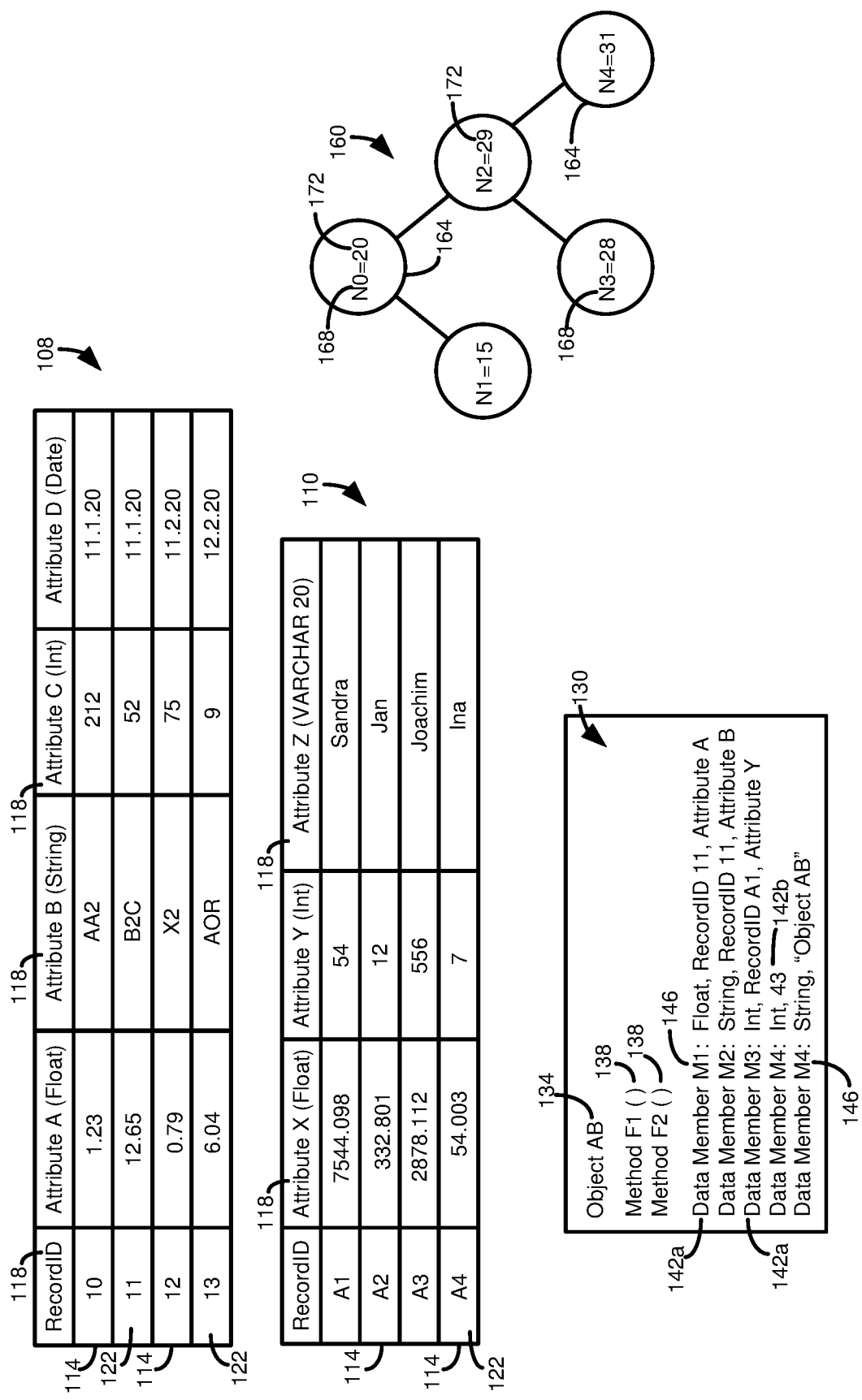
FIG. 1 is a diagram illustrating various data targets that may be used with disclosed technologies.

As computers become more pervasive, integrating data from, or converting data between, different sources can become more complex. For example, it may be desired to use data from different sources in a common application, but the data may be stored in different formats, or using a different schema. Or, it may be desired to migrate data to a new format. Altering data values, or metadata associated with the data values (including a schema used to describe or process the data values) can be cumbersome, as it can require technical knowledge in understanding an initial format and schema of the data, a final, desired format and schema, and how to convert the data from the initial format and schema to the final format and schema.

A user's technical knowledge may determine tools that the user prefers to express how data should be arranged or changed, such as using first order logic statements (e.g., non-technical descriptions of the desired changes), spreadsheets, or actual code (for example, SQL statements). Having different users describe data transformations in different ways can create redundant work, and make it harder for the users to communicate. If team members leave, it may be difficult for new members to understand the prior member's work.

Transforming data may also require someone with a detailed understanding of the use or purpose of the data. As an individual with a detailed understanding of technical aspects of a data set is often not the same individual having a detailed semantic understanding of the data, difficulties can arise in transforming data values or metadata. Accordingly, room for improvement exists.

Often, it will be desired to alter a schema in which data is maintained, or to translate data between schemas. For instance, a user may wish to migrate to a new computing system or to a new software application from a legacy system or software application. In order to accomplish the migration, it may be necessary to migrate data from a legacy schema to a new schema. Or, it may be desired to use a data set with (or from) multiple software applications, but the software applications may use different data formats or schemas. As an example, a first database system may maintain a particular type of data in an attribute "A" of a first schema, and a second database system may maintain that type of data in an attribute "B" of a second schema. Even if the attributes have the same name (e.g., both are "A"), the values can be assigned using different schemas. For example, a first schema may assign values that represent categories as 1, 2, or 3, and a second schema may instead use A, B, or C. In addition, criteria for determining what category is assigned to a particular record may differ between the first schema and the second schema. Disclosed technologies can be used both to determine which data targets will be mapped (e.g., which data targets will be used to define a change to another data target), as well as what values will be assigned to the data target being modified.

Often, a non-technical user will create logical propositions that define how data values or metadata elements should be altered, such as using first order logic statements. These logical propositions can then be expressed in a spreadsheet, typically by more technically sophisticated users, but who still may not be users responsible for final programmatic implementation of a transformation. Eventually, the logical propositions, or spreadsheet representation, can be translated to a programming language, such as SQL (structured query language), to be implemented on an actual data set.

However, spreadsheet expressions of the logical propositions can vary significantly between users, and can be hard to understand, particularly when large numbers of propositions or rules exist. In addition, whether in a spreadsheet representation or in a programming language representation, it can be difficult to reuse results, or to modify rules if conditions change. For example, if a SQL implementation of a data transformation exists, and a particular schema change is added to, removed from, or modified in underlying logical statements, it may be necessary to re-implement the entire SQL code accomplishing a transformation. At the least, determining where/how to modify a programming language implementation of a data transformation can be complex and time consuming.

Disclosed technologies provide a language (which can be referred to as Recursive Rule Language, or RRL) where first order logic statements can be defined and translated into a variety of implementable formats. Typically, the language is not a programming language, or otherwise does not specify operations that can be directly executed by a processor or particular software application. Such languages can be referred to as domain specific languages.

The logic statements can be simple to understand, reusable, and easy to modify. The logic statements can also refer to one another, in a sense being recursive. Accordingly, some or all of a data transformation can be implemented using an automated framework, where first order logic statements can be compiled into commands for a specific execution environment. Even if some aspects of a data transformation cannot, at least initially, be automatically implemented, the cost and time of accomplishing a data transformation, as well as the involvement of programmers or software developers, can be greatly reduced.

The disclosed technologies provide a language for describing first order logic statements, which can be used to define conditions, or rules. The rules can define statements that can be tested for truth or falseness. The rules can include a building block, an operator, and another building block, where the building blocks serve as operands for the operator. Building blocks can be, for example, data targets, a value (e.g., a literal of a datatype, such as a particular value of a float, string, etc., including Boolean values such as TRUE or FALSE), or another rule. A data target can refer to a data structure that can be read from or written to, such as a logical pointer to a particular storage (e.g., memory or secondary storage) location or structure. The data target may have a label or identifier, such as the name of a column/attribute of a relational database table. In a particular example, the data target can be referenced by a URI for a particular data structure (e.g., the name or identifier of the data structure can in turn be mapped to a URI or logical pointer to the data structure, such as to an information schema or data dictionary). Locations (e.g., locations of specific data values or elements of a data target) can also be specified with respect to a particular data structure, such as a particular node of hierarchically arranged data elements (e.g., a graph, heap, or tree), or a particular index position of an array, queue, list, etc.

Actions can be defined, where an action can represent a specific value that is assigned to a data target when a particular rule evaluates to TRUE. For example, if a particular attribute has a particular name or identifier, the name or attribute can be changed to another value. Actions can be aggregated in a rule set or mapping, where a mapping includes a plurality of actions that are sequentially evaluated in a particular, specified order until an action of the mapping (e.g., a rule associated with a particular action) evaluates to true. When an action is determined to be executable, the process of evaluating actions in a given mapping for a given analysis (e.g., a particular application of a rule to a particular instance of rule building blocks) terminates.

In practice, a user can define data targets, rules, actions, and mappings in a language (or notation) that is programming-language independent. The rules, actions, and mappings can be expressed, however, using particular tokens, syntax, and semantics, so that the rules, actions, and mappings are expressed in a standardized manner. The standardized rules, actions, and mappings can then be automatically converted to a particular programming language or other executable format that can then be executed on one or more data sources. As an example, rules, actions, and mappings can be analyzed and automatically converted to one or more SQL statements (such as in a particular SQL dialect—for a particular database system) that can be executed on one or more database systems. Or, the elements of the transformation specification can be converted to scripted commands to cause a software application to perform a transformation.

If a user decides to add, modify, or remove particular rules, actions, or mappings, updated executable instructions can be automatically generated without the need to involve programmers or software developers. Because the elements of the transformation specification in the domain specific language are independent of a particular execution format, the rules, actions, and mappings can be more easily reused. For example, a variety of actions can be defined that use a particular rule without having to rewrite the rule. Similarly, various mappings can be created that include a particular action, without having to rewrite the action. In addition to being easy to reuse, the use of the programming language independent representation of first order logic statements, and other actions using such statements, can be easy to understand, including transformation specification elements that include relationships between multiple elements (e.g., recursively arranged rules, where a given rule references one or more additional rules, which in turn may reference one or more additional rules).

The ease of defining and implementing rules, actions, and mappings can also facilitate debugging efforts. For example, logic statements and other components can be checked for syntactic correctness as the statements are being developed, or otherwise prior to, or during, compilation to a particular executable format. Similarly, the ability to automatically generate executable code or commands can facilitate debugging efforts while rules are being developed, rather than having to wait until rules and other components for an entire data transformation specification have been implemented in a computer-executable format.

Example 2—Example Data Targets and Elements Thereof

FIG. 1 provides examples of data targets that can be used with disclosed technologies. As discussed in Example 1, a data target can be a particular data structure that is capable of storing a plurality of data elements, typically of a particular data type. The data structure typically can be read from, written to, or both, and typically has metadata, such as a name or identifier that can be used to refer to or access the data structure, and optionally location information (e.g., a logical pointer) that can be used to access the data structure. In some cases, the location information can be explicit (e.g., a metadata field can store the location information), while in other cases the location information can be implicit (e.g., the data structure is in memory and a processor "knows" a memory location at which the data structure can be accessed based on the name or identifier of the data structure).

In some cases, a data structure can be "read only," such as when a value, for example an identifier, associated with a first data target (e.g., a name of the data structure, or a particular data element of the data structure) is used to determine whether and how a value should be changed for, or assigned to, a second data target. For example, the identifier of an attribute A might be accessed to determine that an attribute B should be changed to attribute C, but the identifier of attribute A may not be altered. Data targets referenced in actions typically are capable of both being read from and written to using the disclosed technologies. That is, if a data target corresponds to an attribute A of a database table, the identifier of attribute A, and optionally particular values held in the data structure of attribute A, can be read by a disclosed technology, and the identifier of the data structure can also be changed (e.g., changed from A to B). However, it is possible that some data targets need not be read by the disclosed technologies, but only written to.

FIG. 1 illustrates data targets in the form of components of relational database tables 108, 110. The tables 108, 110 can have rows or records 114 and columns or attributes 118. Each row 114 can be associated with an identifier 122, and can provide values for one or more (including all) of the attributes 118 for a given table. An attribute 118 can be associated with a particular datatype, such as a primitive datatype (e.g., integer, float, string, VARCHAR, or date).

The attributes 118 can correspond to particular data targets. A defined rule can analyze the identifier of the attribute, and optionally, values of particular data elements of the particular data target, to determine whether rule conditions are satisfied. Similarly, if the data target is defined with respect to an action, the action can determine what value is written for the data target and, in some cases, particular data elements of the data target type.

Particular data elements, such as a data element at a particular row/column location of a table 108, 110 can be accessed in various manners, such as by identifying a record by its identifier 122 and the name of a particular attribute 118. That is, the identifier 122 can serve as a primary key for a given row 114. In other cases, one or more attribute 118 can serve as a primary key for a row 114. A table 108, 110 may have more than one attribute or combination of attributes that can serve to uniquely identify a given row 114 (e.g., a table may have a primary key and multiple other super keys).

Data elements of a data target, such as the tables 108, 110, can be referenced in other ways, such as using logical pointers to discrete attributes 118 or row/column locations, or using URIs to access a particular table attribute or value. For example, a table 108, 110 can be represented as a two-dimensional array, and particular index positions can be used to access particular rows, particular columns, or particular row/column locations.

FIG. 1 also illustrates data targets in the form of an instance of an abstract data type 130. The abstract data type instance 130 can have an identifier (e.g., a "name" of a variable, or instance, of the datatype) 134, optionally one or more methods 138, and one or more data members 142 (shown as data members 142a, 142b), each of which can be associated with an identifier 146, and can correspond to a data target. The identifiers 146 can be used to refer to the corresponding data target. All or a portion of the data members 142, such as data members 142a, can be mapped to values in another data target, such as row/column locations of a table 108, 110. Other data members 142b can have data targets that are defined in the instance 130, not with reference to another data target or other data source. The data members 142 can be accessed by referencing the instance identifier 134 and the relevant data member identifier 146.

A tree 160 is provided as another example of a data target formed from a collection of data elements. The tree 160 includes a plurality of hierarchically arranged nodes 164. Each node 164 can have a node identifier 168 and can store at least one value 172. In at least some cases, the value 172 of a node 164 for read or write purposes can accessed by specifying the node identifier 168. In other cases, the appropriate node 164 can be located in another manner, such as by specifying a current value 172 of the node. That is, the tree 160 can be defined in such a way that a given value 172 can be located by suitably traversing the tree. Similar considerations can apply for reading or writing values in another type of data structures (e.g., stacks, queues, lists, heaps, or graphs).

Typically, particular data targets (e.g., the attributes 118 or data member identifiers 146) can be analyzed to determine whether they meet particular criteria, such as having a particular value that satisfies one or more rules (e.g., having an attribute or data member name that matches the rule criteria). In some cases, particular data elements of a data target can be analyzed to determine whether they meet the rule criteria (e.g., if rows of a table have attribute values that satisfy the criteria). If the particular criteria are met, a value associated with another specific data target type can be modified (e.g., if an attribute has a specified value, another attribute, which can be for a data target instance being analyzed, can be assigned a particular value, such as values for a first attribute being analyzed and used to assign values of A or B to a second attribute, depending on the values). As an example, in SQL, a rule can be defined to select data values meeting first criteria for a first data target identifier and to map the values to a new identifier.

Example 3—Example Elements of a Data Transformation Specification

Figure 2:
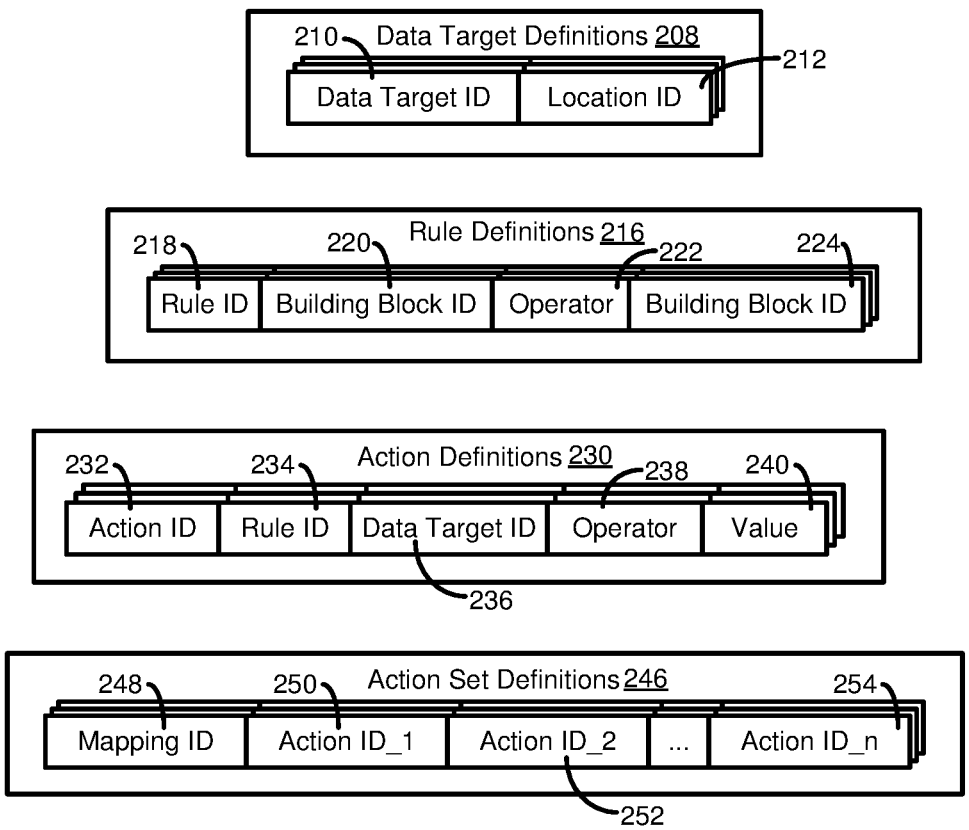
FIG. 2 is a diagram illustrating definition formats for various components of a data transformation specification.

FIG. 2 illustrates examples of how data targets, rules, actions, and rule sets (or mappings) can be defined in a particular programming language-independent representation, such as a domain specific language. Data target definitions 208 can include a data target identifier 210 and a location identifier 212. The data target location identifier 212 be information sufficient to access (e.g., read, write, or both read and write access) a value associated with the data target, such as an identifier for the data target in a schema, and which in at least some cases can also be used for reading values associated with instances of the data target or writing a value for instances of the data target. That is, the data target location identifier 212 can serve as a logical pointer to values (including metadata values) associated with the data target identifier 210. In particular examples, the data target location identifier 212 can be a URI or a file path, such as to a schema or data dictionary definition of the data target (e.g., a path to the name of the data target in an information schema or a data dictionary).

In some cases, the data target location identifier 212 can be omitted, at least for purposes of defining a data transformation specification. For example, a data target can be created that will hold a value assigned by a particular action (as described herein). The data target can later be mapped to a data target location identifier 212, such as a location identifier for a particular schema element, such as an attribute name in a database schema.

Language elements can be provided to declare data targets. For example, the following statement declares data target "OBJ_1" and data target "OBJ_2":

DATA OBJECT DEFINITION: OBJ_1, OBJ_2

The above definition defines two data objects (or data targets) which can later be tested for particular values using rules, as described below. OBJ_1 and OBJ_2 can be used to refer to particular attributes of one or more tables of a relational database system, in a particular implementation. That is, a table may have an attribute with the name "OBJ_1."

Rule definitions 216 can include a rule identifier 218 that can be used to access or identify a given rule. Each rule can have the form <building block> <operator> <building block>, in a particular implementation. As shown in FIG. 2, an implementation of this format is shown as each rule identifier 218 being associated with a first building block ID 220, an operator 222, and a second building block ID 224. A building block, such as building blocks 220, 224, can be selected from a data target, a literal (e.g., a particular value of a particular datatype, including Boolean values), or another rule. Operators can include, for example, operators such as equality, greater than, less than, greater than or equal to, less than or equal to, OR (logical or), AND (logical and), or XOR. Operators may also be negated (e.g., NOT, !), in particular implementations. According to an example rule definition syntax, example rule definitions include:

RULE DEFINITION rule_1: OBJ_1='Category A'
RULE DEFINITION rule_2: OBJ_2>5.5
RULE DEFINITION rule_3: rule_1 AND rule_2 When the above rules are executed, particular schema elements, and values associated therewith, can be tested for rule compliance. For example, OBJ_1 and OBJ_2 can be particular database columns, and values in these columns can be evaluated to determine if the rules are satisfied for such values. From the above examples, it can be seen that rules can be recursive, in that a given rule can be defined with reference to other rules.

Action (or consequence) definitions 230 can include an action identifier 232 that can be used to access or identify a given action. Each action can have the form <rule> <data target> <operator> <value>, shown in FIG. 2 respectively as 234, 236, 238, 240. The operator 238 is typically the assignment operator. According to an example action definition syntax, an example action definition is:

CONSQUENCE DEFINITION consequent_1: rule_1→OBJ_2='CAT_A' The above definition means that when the value of a row for OBJ_1 is "Category A" the corresponding instance for OBJ_2 will be given a value of "CAT_A," thus allowing the instance to be converted from a first schema to a second schema.

Actions can be evaluated individually, or as sets. Action set, or mapping, definitions 246 can include a mapping identifier 248 that can be used to access or identify a particular mapping. As shown in FIG. 2, an action set includes a plurality of action identifiers 250, 252, 254. An action set typically applies an order to the included action identifiers 250, 252, 254. The action identifiers 250, 252, 254 are sequentially evaluated until the conditions of a particular action are satisfied, or all action identifiers for the rule set have been evaluated, and none were found to be satisfied. Normally, once the conditions for a particular action 250, 252, 254 are satisfied, the action is executed, and further evaluation of the rule set is discontinued, at least for a particular instance being evaluated. An example action set definition format can be <action> <action> <action>, with a specific example being:

MAPPING DEFINITION mapping_1: action_1, action_2 In the above definition, action 1 will first be evaluated. If the rule for action 1 is satisfied, the consequence for action 1 will be executed, and action 2 will not be evaluated for the instance being evaluated. If the rule for action 1 is not satisfied for a given instance, the rule for action 2 will be evaluated.

Example 4—Example Rule Recursion

Figure 3:
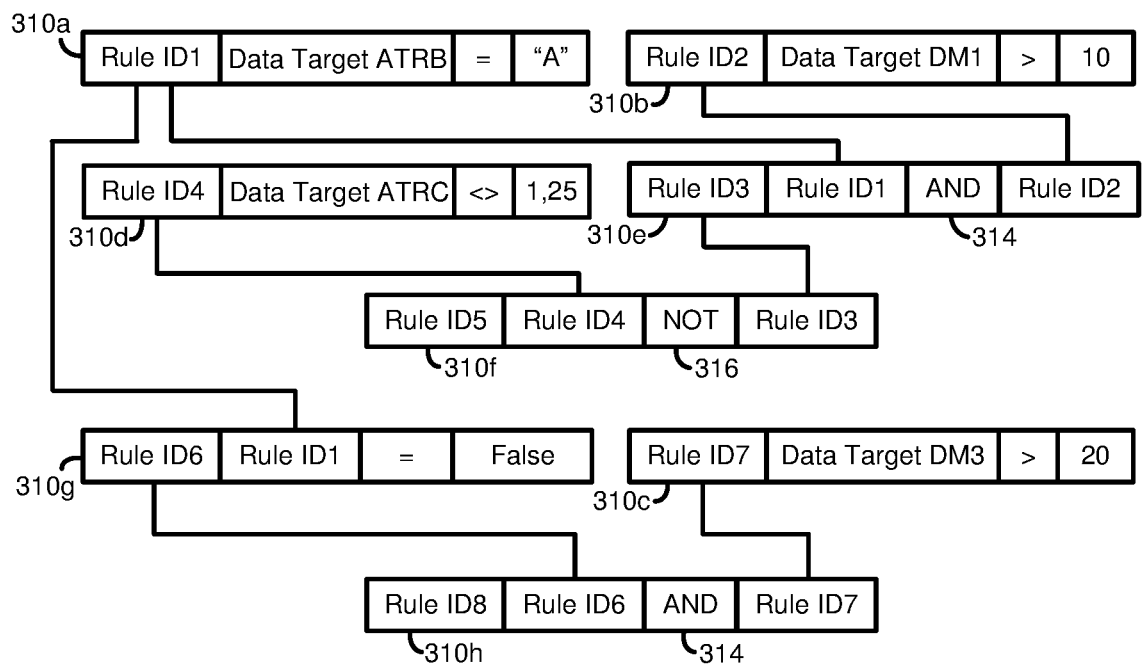
FIG. 3 is a diagram illustrating various rules, and how rules may be recursively related to one another.

FIG. 3 illustrates how rules can reference other rules, thus providing a recursive relationship between rules. FIG. 3 illustrates a plurality of rules 310 (rules 310a-310h as shown). Rules 310a, 310b, 310c are "independent," in that they do not themselves reference another rule. However, each of the rules 310a, 310b, 310c are referenced by one or more of recursively defined rules 310d, 310e, 310f, 310g, 310h. Rules 310d-310h are recursive in the sense that determination of the result for a given rule requires evaluation of one or more additional rules that are referenced by the given rule.

Rules 310e and 310h are both defined with reference to two other rules, and evaluate to true if both referenced rules evaluate to true, as indicate by the AND operators 314. Rule 310f is also defined with respect to two other rules, but evaluates to true if the first referenced rule evaluates to true and the second referenced rule evaluates to false, as indicated by the NOT operator 316.

Note that rule 310h involves two levels of recursion, as rule 310h references rule 310g, which in turn references rule 310a. Similarly, rule 310f references rule 310e, which in turn references rules 310a and 310b. Note also that a rule, such as rule 310a, can be referenced by multiple rules, such as being directly referenced by rules 310g and 310e, and indirectly referenced by rules 310h and 310f. Although not shown in FIG. 3, a given rule need not have a recursive relationship with any other rule—neither being referenced by another rule or referencing another rule.

FIG. 3 illustrates several important advantages of the disclosed technologies. For example, FIG. 3 illustrates how a given rule, such as rule 310a, can be reused in conjunction with multiple other rules. Although not shown in FIG. 3, another way that rules, such as rule 310a, can be reused is by incorporating a given rule into multiple actions, where an action in turn can be incorporated into multiple action sets.

Example 5—Example Implementation Architecture

Figure 4:
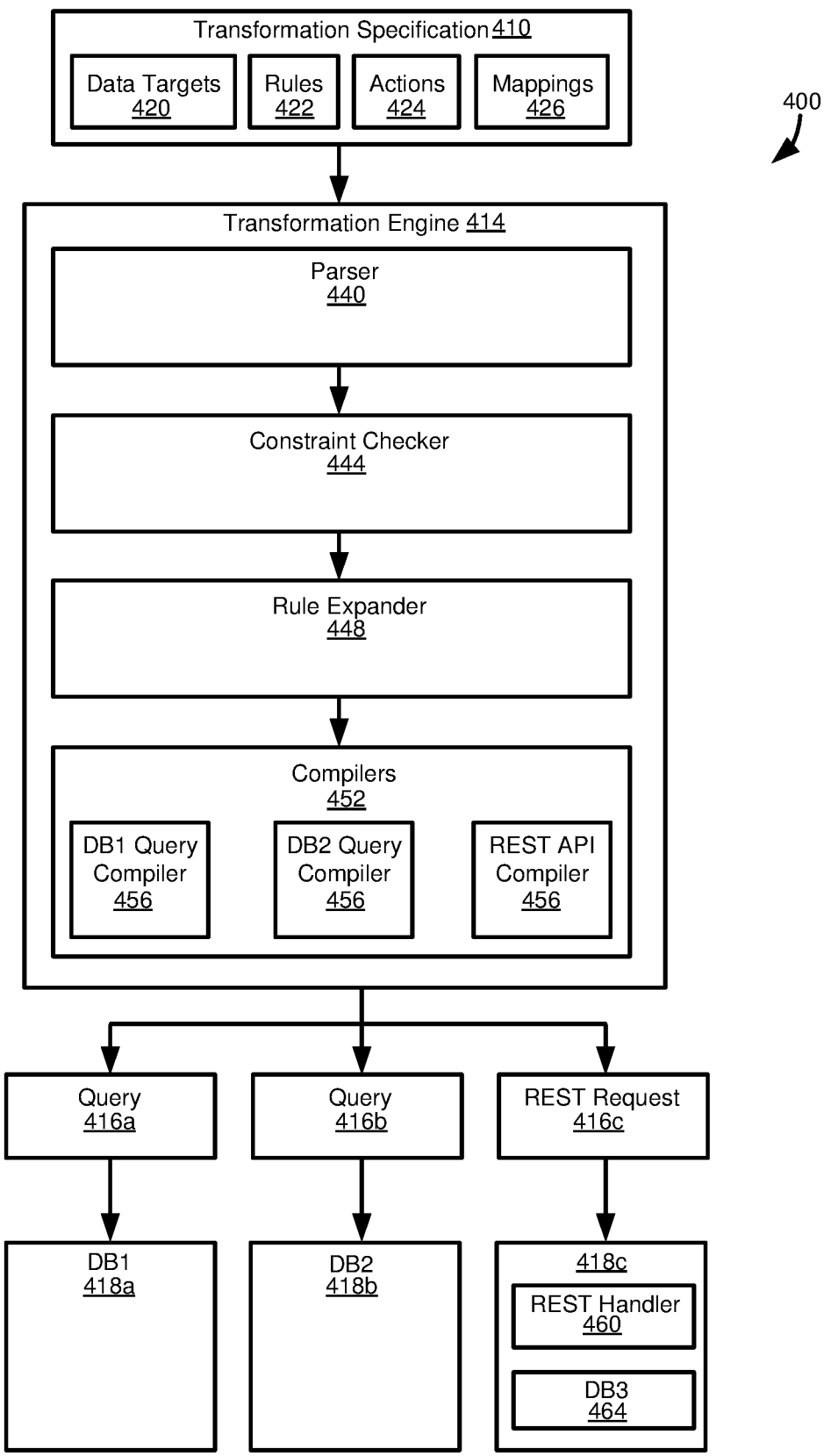
FIG. 4 is a diagram illustrating an example computing architecture in which disclosed technologies can be implemented.

FIG. 4 illustrates an example architecture 400 in which disclosed technologies can be implemented. The architecture 400 generally includes a transformation specification 410, a transformation engine 414, one or more executable transformations 416 (shown as transformations 416a-416c), and one or more data stores (also referred to as data sources) 418 (shown as 418a-418c). The transformation specification 410 includes information sufficient to define a transformation in a programming-language independent representation, such as a domain specific language having the syntax shown in FIG. 2. The transformation specification 410 can be defined in a file, data structure, abstract data type, serialized format (e.g., JSON or XML), or other suitable representation. In some cases, the transformation specification 410 directly includes relevant transformation elements, such as rule definitions, action definitions, and the like. In other cases, the transformation specification 410 can define transformation elements (e.g., rules, actions) that are maintained or defined elsewhere, optionally including in one or more of the data stores 418. As an example, transformation specification 410 can include a full definition of a Rule X, or can indicate using an identifier that Rule X is used by the transformation, where the definition of Rule X can then be accessed by, or made available to, the transformation engine 414.

In some cases, the transformation specification 410 includes definitions of, or references to, data targets 420, rules 422, actions 424, mappings 426, or combinations thereof. Particularly when definitions of elements of a transformation specification 410 are not provided in the transformation specification itself, the transformation specification can include fewer elements. For example, it may be sufficient to include identifiers for actions 424 or mappings 426 that are used in the transformation specification 410. When the actions 424 or mappings 426 are accessed, the underlying rules, data targets, and, in the case of mappings, actions, can be determined and accessed (e.g., if an action X is defined with respect to rule Y, the transformation specification 410 can include a reference to action X, and when the definition of action X is accessed, it can be determined that the definition of rule Y should also be accessed in order to fully process action X).

The transformation engine 414 can include a parser 440, a constraint checker 444, a rule expander 448, and a compiler module 452. The parser 440 can process a transformation specification 410 to determine data targets 420, rules 422, actions 424, and mappings 426 included in the transformation specification. In the event references to elements of a transformation specification 410 are included rather than a full definition, the parser 440 (or another component, including a component not shown in FIG. 4) can retrieve full definitions for use in generating the executable transformations 416.

The constraint checker 444 can analyze components of the transformation specification 410, as provided by the parser 440, to determine whether the components comply with various constraints. One constraint can be syntactic correctness. Another constraint can be that components of the transformation specification 410 do not refer to components that are not included in the transformation. For instance, a constraint violation can be indicated if a mapping includes Action 1, Action 2, and Action 3, and Action 2 is not included in the transformation specification. Another constraint can be correct operator usage, such as making sure that a logical expression (e.g., AND) includes expressions on both sides of the operator. In some cases, the constraint checker 444 can perform more complex constraint checking, such as making sure a referenced data target exists on a data source 418, or confirming that data types associated with elements of the transformation specification 410 are the same or at least compatible (e.g. a comparison between an integer and a float may be allowed, as the types are compatible, but a comparison between an integer and a string may generate a constraint violation).

Figures 5, 6:
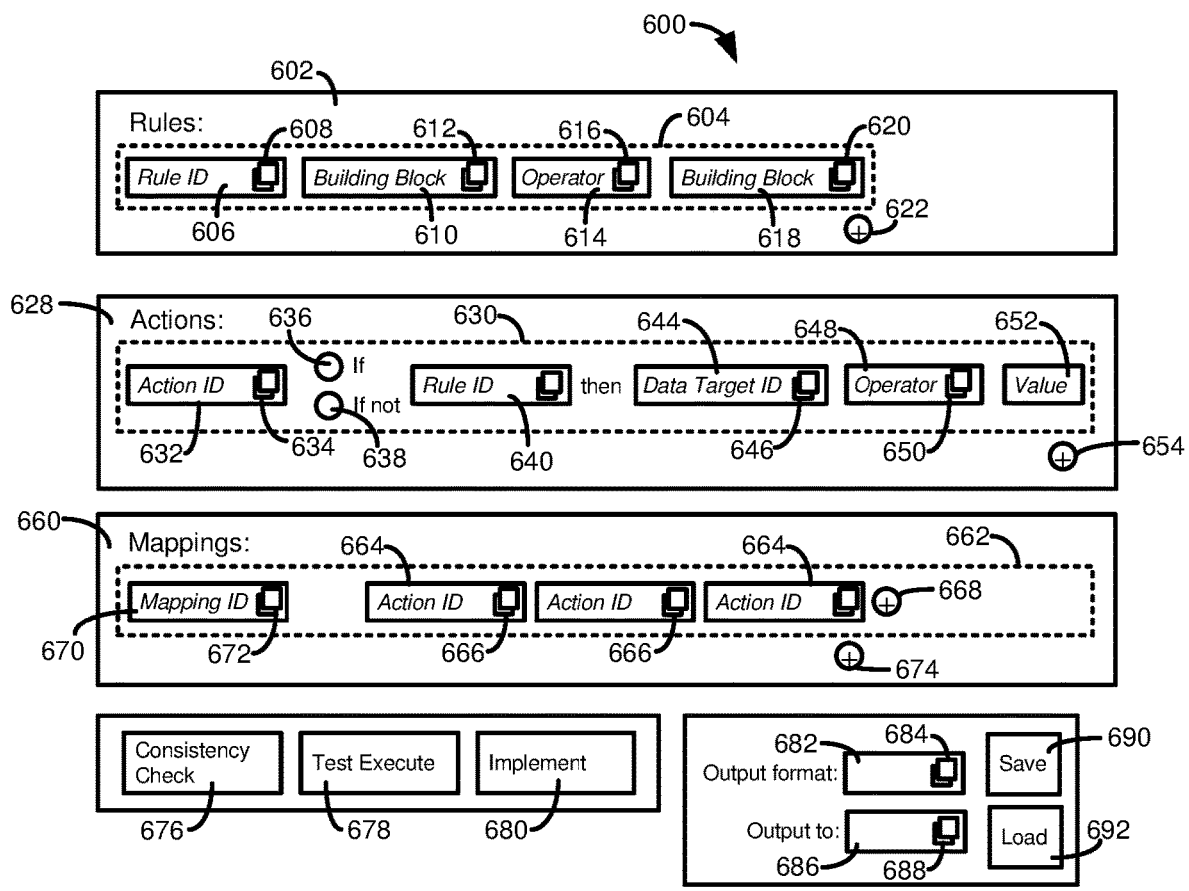
FIG. 5 illustrates how recursively defined rules can be converted to combined or nested conditional statements.
FIG. 6 is an example user interface screen for defining a data transformation specification.

The rule expander 448 can generate statements that can be converted by the compiler module 452 to an executable transformation 416. FIG. 5 illustrates an example of how a rule, rule_3, can be defined in terms of other rules, rule_1 and rule_2. The initial version of rule_3 does not independently contain enough information for rule_3 to be compiled into an executable format. The rule expander 448 can incorporate the definitions of rule_1 and rule_2 into a revised version 510 of rule_3, which directly includes the definitions of rule_1 and rule_2, and thus can be compiled into an executable format. In some cases, the rule expander 448 combines conditional statements associated rules having a recursive relationship into a nested manner, as shown in the revised version 520 of rule_3. The nested conditional statements can then be compiled into a particular executable format.

Although the rule expander 448 may be needed to convert at least some rules (e.g., rules that recursively reference other rules) into a form that can be compiled into an executable format, the conversion can be carried out automatically, rather than requiring manual conversion (e.g., manual code writing) by a programmer or software developer, or being required to be entered initially in a non-recursive manner (e.g., in the form 510 or 520). Thus, the rule expander 448 can facilitate the use of relatively simple rules (e.g., first order logic statements) as building blocks for complex rules, which in turn facilitates rule re-use, ease of understanding of rules and their interrelationships, debugging, and rule creation.

Returning to FIG. 4, the compiler module 452 can include one or more compiler engines 456. The compiler engines 456 are configured to convert elements of the transformation specification 410, including as processed by the parser 440, constraint checker 444, and rule expander 448, to an executable format 416 that can be executed by one or more of the data sources 418. Although shown as separate, multiple, including all, compiler engines 456 can be implemented in a single component, having routines for converting from a programming language independent format to a given executable format, which can be in a programming language or a collection of instructions that can be implemented by one of the data sources 418.

As an example of how a programming language-(or other executable instruction-) independent representation of the transformation specification 410 can be converted to one or more of the executable formats 416, which can then be executed on respective data sources 418, consider a scenario that includes a data source 418a, in the form of a database using a first query language (e.g., a particular dialect of SQL that may be used with database software provided by a particular vendor), a data source 418b, in the form of a database using a second query language (e.g., a dialect of SQL that is different than the dialect used by the data source 418a), and a data source 418c that is configured to receive requests for database operations (e.g., queries) using REST protocols, such as the OData protocol. The data source 418c can include a handler 460 that processes REST requests, which are then executed against a database system 464.

The transformation engine 414 can select the appropriate compiler engine 456 to produce a suitable executable transformation 416 that can be executed against a selected data source 418. That is, a user can select a particular data source 418, and the transformation engine 414 can convert the transformation specification 410 into an executable transformation 416a in the first SQL dialect, used by the data source 418a, an executable transformation 416b in the second SQL dialect, used by the data source 418b, into REST requests/API calls 416c to be processed by the data source 418c, or to multiple of these formats. In other cases, a user can select one or more formats for executable transformations 416 without having the corresponding executable transformation be sent to a data source 418 for execution (e.g., the executable transformation can be stored).

Example 6—Example Transformation Specification Definition User Interface

FIG. 6 is an example user interface screen 600 where a user can enter components of a data transformation specification in a programming language independent manner, as well as configure execution options. The screen 600 can provide a rule definition panel 602 that includes a template 604 for defining rules, such as having a field 606 where a user can enter an identifier for a rule being created, or can select an icon 608 to browse for a rule. That is, rules can be defined and stored for reuse, and the icon 608 can allow a user to select a rule repository and browse for rules. If the user selects a rule using the icon 608, rule elements can be populated in the screen 600. In some cases, the user may be allowed to modify populated rule elements.

The template can include a field 610 where a user can specify a first operand, or building block. As with the rule identifier field 606, the first operand field 610 can include an icon 612 that a user can select to browse for previously defined or specified operands. In some implementations, instead of, or in addition to, providing an icon 608, 612 that a user can select to browse for elements, representations of available elements can be provided on the screen 600, and a user may build rules by dragging and dropping elements into the appropriate location on the template 604. Similar functionality can be provided for other templates depicted in FIG. 6, which templates are further described below.

A user can enter an operator into an operator field 614, which can include an icon 616 which can be selected to choose from a list of available operators. For example, a window of available operators may be displayed when the icon 616 is selected, and the user can select one of the displayed operators. A second building block can be specified in operand field 618, including by selecting from available building blocks using icon 620. A user can select to add additional rules by selecting user interface element 622.

The screen 600 can include an action definition panel 628 that includes a template 630 for defining actions. The template 630 can include a field 632 where a user can enter an identifier for an action being created, or can select an icon 634 to browse for actions, which can be carried out at least generally as described for the rule template 604. In at least some examples, a user can select a user interface element 636 to indicate that the action is satisfied if a rule entered in a rule field 640 evaluates to true, or a user interface element 638 to indicate that the action is satisfied if a rule entered in the rule field evaluates to false.

The action template 630 includes elements that allow a user to specify actions that should be taken if the action conditions are met. A user can enter an identifier for a data target in field 644, or browse for data targets by selecting an icon 646. A user can enter an operator in field 648, or browse for an operator by selecting a user interface element 650, in a similar manner as for the operator field 614. A value can be entered in a field 652. As has been described, typically the operator for the operator field 648 is the assignment operator. Accordingly, in at least some cases, the operator field 648 and icon 650 can be omitted. If the conditions for the given action are satisfied for a given data instance, the value in the field 652 is assigned to the instance for the data target entered in the field 644. A user can select to create additional actions by selecting icon 654.

The screen 600 can provide a mapping definition panel 660 that includes a template 662 for defining mappings, or action sets. The template 662 can allow a user to enter actions for the mapping in fields 664, or to browse for actions by selecting an icon 666. Additional fields 664 can be added to a given mapping template 662 by selecting a user interface element 668. An identifier for the mapping can be specified in a field 670, or a user can browse for mappings by selecting an icon 672. Additional mappings can be created by selecting an icon 674.

A user can select to take various actions using information entered in the panels 602, 628, 660. For example, a user can select a consistency check user interface element 676, which can analyze the entered information to determine whether it is consistent, such as described with respect to the constraint checker 444 of FIG. 4. For example, selecting the consistency check user interface element 676 can run a check to determine whether all actions specified for a mapping in the panel 660 reference actions that exist in the panel 628 (or in another repository, at least in some examples). Similarly, selecting the user interface element 676 can run a check to determine whether all rules and data targets specified for an action 628 exist in the panel 602, or another repository. In the event inconsistencies exist, a user can be provided with a visual indication of the problem (e.g., "mapping X, action Z does not exist").

A user can select to test transformation information entered in the screen 600 by selecting a test execute icon 678. In some cases, selection of the test execute icon 678 causes results to be generated using a data set to which the rules are applied, but does not change the underlying data set. If the user wishes to implement a particular set of transformation operations, the user can select an implement user interface element 680, which can cause the transformation entered in the screen 600 to be executed against a specified data source, and the underlying data is modified according to the specified operations.

A user can select other options, such as an output format, which can be specified in a field 682, or selected from available options by selecting icon 684. The output format can determine what programming language or execution instruction type, such as SQL, the transformation operations will be converted to (e.g., specifying a particular compiler engine 456 of FIG. 4 to be used). Similarly, the user can specify a particular data source to be which a transformation specification will be applied in field 686, or can select from available data sources by selecting icon 688.

As described above, transformation elements, or entire transformation specifications, can optionally be saved to, or loaded from, a repository. A user can select to save a transformation specification entered via the screen 600 using a save icon 690, or to load a transformation specification using a load icon 692.

Example 7—Example Executable Format Generation from Domain Specific Language Definition of Transformation Specification FIG. 7 provides an example transformation specification 710 and resulting SQL code 712 that can be produced using the disclosed technologies. The transformation specification 710 includes four data targets 714, OBJ_1-OBJ-4. The data targets can correspond to fields of one (or more) relational database tables. Rule definitions 716 specify particular values of the fields (or attributes) that will result in the rule evaluating to TRUE. Rule definition 716a is recursive, and evaluates to TRUE when two of the rules 716 both evaluate to true.

The transformation specification 710 includes two actions, or consequences, 722 (shown as 722a, 722b), which specify values that will be assigned to OBJ_4 when particular rules are satisfied. A mapping 726 specifies that both actions 722 are to be evaluated, and that action 722a is to be evaluated before action 722b. As described, if the rule 716a for action 722a evaluates to TRUE, the corresponding consequence (e.g., assignment) is carried out, and action 722b is not evaluated. If the rule 718 is not satisfied, the consequence of action 722a is not carried out, and action 722b is evaluated.

The SQL code 712 is nested query that includes a main SELECT statement 730 that selects results of one of inner SELECT statement 734 and inner SELECT statement 738. Statement 742 indicates that results of only one of statement 734 or 738 will be returned by the main SELECT statement 730. Inner SELECT statements 734, 738 operate similarly to a CASE statement (e.g., in C, C++), or a series of conditional statements, where the first conditional statement that is satisfied is executed, and then further evaluation of the conditional statements ceases.

Example 8—Example Data Target Generation

In some cases, a disclosed domain specific language, that is not a programming language, may not be powerful enough to accomplish a particular data transformation. For example, a transformation may require operations such as calculations, join operations (e.g., in a relational database system), groupings, aggregation operations, etc. However, a new data target can be created where the desired operations have been applied. For example, a more technical user can create a database view, and the database view (such as a particular field of the database view) can serve as the data target for the domain specific language. Thus, while often the vast majority of transformation operations can be natively accomplished using the disclosed domain specific language, such as on a "base" database system, operations that cannot natively be accomplished can still be carried out using the domain specific language, once a suitable data target has been created. Although some intervention by a technical use may be required, the overall process for conducting a data transformation can still be greatly simplified compared with a scenario where the disclosed domain specific language is not used.

Example 9—Example Data Transformation Operations

FIG. 8 is a flowchart of an example method 800 of compiling a transformation specification in a domain specific language to an execution format. The method 800 can be implemented in the computing architecture 400 of FIG. 4. At 810, user input is received defining at least a first rule. The at least a first rule is of a rule format. The rule format includes a first building block, an operator, and a second building block. The first and second building blocks serve as operands for the first operator, and are selected from rules having the rule format, a data target, or a literal of a data type.

User input is received at 820 defining at least one action. The at least one action is of an action format. The action format includes a rule serving as a predicate for the at least one action, a second operator to be executed if the predicate is satisfied, a data target serving as a first operand for the second operator, and a value serving as a second operand for the second operator. At 830, a transformation specification is instantiated that includes the at least a first rule and the at least one action. An execution format to which the transformation specification is to be converted is determined at 840. At 850, the transformation specification is compiled to the execution format.

FIG. 9 is a flowchart of a method 900 that can be performed by domain specific language compiler. The method 900 can be carried out in the computing environment 400 of FIG. 4. At 910, a data transformation specification in a domain specific language is retrieved. The data transformation specification is parsed at 920 to determine at least a first rule and a least a second rule specified in the data transformation specification. The data transformation specification is parsed at 930 to determine at least a first action specified in the data transformation specification. At 940, it is determined that the at least a second rule references the at least a first rule. Nested conditional statements are generated at 950, representing conditions of the at least a first rule and the at least a second rule. An execution format is determined at 960. At 970, the nested conditional statements are compiled to the execution format.

FIG. 10 is a flowchart of a method 1000 for rendering a data transformation specification user interface useable to define a data transformation specification in a domain specific language. At 1010, a rule definition templated is displayed. The rule definition template includes a user interface element for a first building block, a user interface element for an operator, and a user interface element for a second building block. An action definition template is displayed at 1020. The action definition template includes a user interface element for a rule and a user interface element for a value. At 1030, user input is received for the rule definition template and the action definition template, defining at least one rule and at least one action. A data transformation specification in a domain specific language is generated at 1040, and includes the at least one rule and the at least one action.

Example 10—Computing Systems

Figure 11:
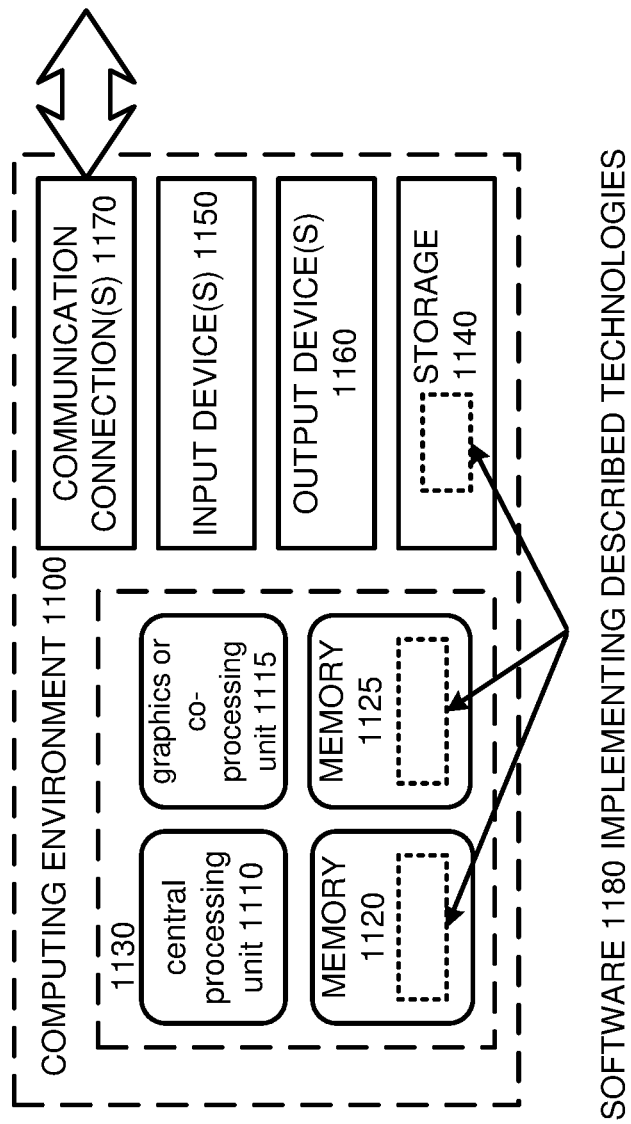
FIG. 11 is a diagram of an example computing system in which some described embodiments can be implemented.

FIG. 11 depicts a generalized example of a suitable computing system 1100 in which the described innovations may be implemented. The computing system 1100 is not intended to suggest any limitation as to scope of use or functionality of the present disclosure, as the innovations may be implemented in diverse general-purpose or special-purpose computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 execute computer-executable instructions, such as for implementing components of the computing environment 400 of FIG. 4. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 stores software 1180 implementing one or more innovations described herein, in the form of computer-executable instructions suitable for execution by the processing unit(s) 1110, 1115.

A computing system 1100 may have additional features. For example, the computing system 1100 includes storage 1140, one or more input devices 1150, one or more output devices 1160, and one or more communication connections 1170. An interconnection mechanism (not shown) such as a bus, controller, or network interconnects the components of the computing system 1100. Typically, operating system software (not shown) provides an operating environment for other software executing in the computing system 1100, and coordinates activities of the components of the computing system 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing system 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing system 1100. The output device(s) 1160 may be a display, printer, speaker, CD-writer, or another device that provides output from the computing system 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 12:
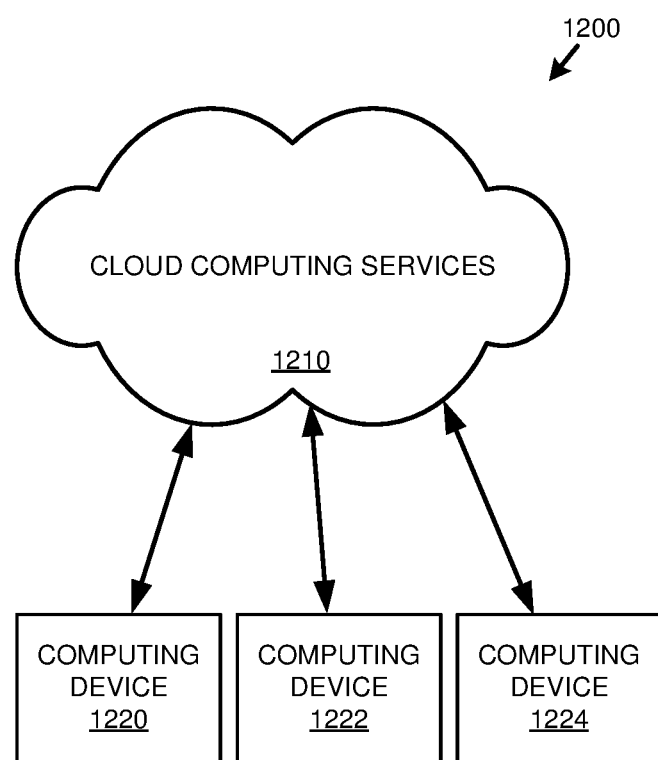
FIG. 12 is an example cloud computing environment that can be used in conjunction with the technologies described herein.

FIG. 12 depicts an example cloud computing environment 1200 in which the described technologies can be implemented. The cloud computing environment 1200 comprises cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 are utilized by various types of computing devices (e.g., client computing devices), such as computing devices 1220, 1222, and 1224. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operators (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1120 and 1125, and storage 1140. The term computer-readable storage media does not include signals and carrier waves. In addition, the term computer-readable storage media does not include communication connections (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C #, Java, Perl, JavaScript, Python, R, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
receiving first user input defining at least a first rule, the at least a first rule being in a rule format comprising a first building block, a first operator, and a second building block, wherein the first and second building blocks serve as operands for the first operator and are selected from rules having the rule format, a data target, or a literal of a data type, and wherein a rule in the rule format evaluates to a Boolean result;
receiving second user input defining at least a second rule, the at least a second rule being in the rule format and comprising the at least a first rule as the first building block or as the second building block;
receiving third user input defining at least one action, the at least one action being of an action format comprising the at least a second rule serving as a predicate for the at least one action, a second operator to be executed if the predicate is satisfied, a data target serving as a first operand for the second operator, and a value serving as a second operand for the second operator;
instantiating a transformation specification comprising the at least a second rule and the at least one action;
determining an execution format to which the transformation specification is to be converted; and
compiling the transformation specification to the execution format.

2. The method of claim 1, further comprising:
receiving fourth user input defining at least a third rule in the rule format, wherein the at least a first rule is the first building block of the at least a second rule and the third rule is the second building block of the at least a second rule.

3. The method of claim 1, further comprising:
checking the transformation specification for constraint compliance, the checking comprising:
for rules of the transformation specification, determining if a given rule includes at least another rule as a building block;
determining that the given rule includes the at least another rule;
for a given rule that includes at least another rule as a building block, determining if a definition of the at least another rule is determinable from the transformation specification;
for actions of the transformation specification, determining a rule referenced by a given action; and
determining if a definition of the rule referenced by the given action is determinable from the transformation specification.

4. The method of claim 1, further comprising:
sending the execution format to a data source to be executed.

5. The method of claim 1, wherein the execution format is a query language.

6. The method of claim 1, wherein the execution format is the structured query language.

7. The method of claim 1, further comprising:
selecting from a plurality of available compiler engines a compiler engine suitable for compiling the transformation specification to the execution format.

8. The method of claim 1, wherein the transformation specification comprises at least one rule in the rule format that recursively references another rule, the method further comprising:
generating an integrated rule expression that includes operators and building blocks from the at least one rule and the another rule.

9. The method of claim 1, further comprising:
receiving user input defining at least one mapping, the at least one mapping comprising the at least a first action and at least a second action in the action format in a defined sequence.

10. The method of claim 9, further comprising:
executing the transformation specification in the executable format, the executing comprising:
executing a first action in the defined sequence according to the defined sequence;
determining that the first action is satisfied;
executing the second operator of the first action; and
not executing further actions in the mapping.

11. The method of claim 9, further comprising:
executing a first action in the defined sequence according to the defined sequence;
determining that the first action is not satisfied; and
executing the second action in the defined sequence.

12. The method of claim 1, wherein the data target is a first data target derived from a second data target and at least a third data target.

13. The method of claim 1, wherein the at least the first building block or the at least a second building block of the at least a first rule is a data target corresponding to an attribute name of a relational database table.

14. The method of claim 13, wherein the data target corresponding to the attribute name is associated with location information for accessing the attribute name for at least reading or writing.

15. One or more computer-readable media comprising instructions that, when loaded into a memory of a computing device and executed on the computing device, perform operations for rendering a data transformation specification user interface useable to define a data transformation specification in a domain specific language, the operations comprising:
displaying a rule definition template, the rule definition template comprising a user interface element for a first building block, a user interface element for an operator, and a user interface element for a second building block, wherein rules defined using the rule definition template evaluate, when called, to a Boolean result;
displaying an action definition template, the action definition template comprising a user interface element for a rule and a user interface element for a value;
receiving first user input for the rule definition template and the action definition template defining at least a first rule and at least a first action;
receiving second user input for the rule definition template and the action definition template defining at least a second rule and at least a second action, the at least a second rule comprising the at least a first rule as a first building block or as second building block of the at least a second rule, wherein the at least a second action is the at least a first action or is an action other than the at least a first action; and generating a data transformation specification in a domain specific language comprising the at least a second rule and the at least a second action.

16. The one or more computer-readable media of claim 15, the operations further comprising:
checking the data transformation specification for constraint compliance, the checking comprising:
for rules of the data transformation specification, determining if a given rule includes at least another rule as a building block;
for a given rule that includes at least another rule as a building block, determining that the given rule includes the at least another rule;
determining if a definition of the at least another rule is determinable from the data transformation specification;
for actions of the data transformation specification, determining a rule referenced by a given action; and
determining if a definition of the rule referenced by the given action is determinable from the data transformation specification.

* * * * *